United States Patent [19]

Boesch

[11] Patent Number: 5,755,426
[45] Date of Patent: May 26, 1998

[54] VALVE MECHANISM FOR A VACUUM VALVE

[76] Inventor: Hubert Boesch, Sandstrasse 29, A-6890 Lustenau, Austria

[21] Appl. No.: 745,309

[22] Filed: Nov. 12, 1996

Related U.S. Application Data

[63] Continuation of Ser. No. 447,342, May 23, 1995, abandoned.

[30] Foreign Application Priority Data

May 24, 1994 [DE] Germany ............... 44 18 019.5

[51] Int. Cl.⁶ ................................................. F16K 31/44
[52] U.S. Cl. ................................... 251/158; 251/193
[58] Field of Search .................... 251/193, 203, 251/158, 252

[56] References Cited

U.S. PATENT DOCUMENTS

| | | | |
|---|---|---|---|
| 3,046,802 | 7/1962 | Ceyedo | 251/252 X |
| 3,120,944 | 2/1964 | Logez et al. | 251/203 X |
| 3,442,295 | 5/1969 | Ver Nooy . | |
| 4,721,282 | 1/1988 | Shawver et al. . | |
| 5,002,255 | 3/1991 | Sawa et al. . | |
| 5,108,073 | 4/1992 | Adachi | 251/252 X |
| 5,120,019 | 6/1992 | Davis, Jr. | 251/193 |
| 5,626,324 | 5/1997 | Nakamura et al. | 251/158 X |
| 5,641,149 | 6/1997 | Ito | 251/158 |

FOREIGN PATENT DOCUMENTS

| | | |
|---|---|---|
| 0164171 | 12/1985 | European Pat. Off. . |
| 0441646 | 8/1991 | European Pat. Off. . |
| 1281001 | 5/1962 | France . |

*Primary Examiner*—John Fox
*Attorney, Agent, or Firm*—Spencer & Frank

[57] ABSTRACT

A valve mechanism for a vacuum sliding valve. The mechanism includes a valve housing defining a vacuum chamber having a throughgoing opening therein and being free from setting elements which move relative to one another; a drive region disposed adjacent to and outside of the vacuum chamber; and a sealing interface disposed between the vacuum chamber and the drive region for sealing the vacuum chamber and the drive region with respect to one another. The mechanism further includes a valve disk disposed in the vacuum chamber, and a drive connected to the valve disk and disposed in the drive region for moving the valve disk for sealingly closing the throughgoing opening with the valve disk. A rod of the mechanism has a first end disposed in the vacuum chamber and a second end disposed in the drive region, and is connected to the valve disk at the first end thereof and sealingly extends through the sealing interface and out of the vacuum chamber. The rod further engages with the drive at the second end thereof, the drive thus positively controlling an actuation of the rod from a region outside of the vacuum chamber. The mechanism further includes a tilting bearing disposed at the sealing interface and configured such that the rod tilts about the tilting bearing and moves translationally through the tilting bearing for sealingly closing the throughgoing opening with the valve disk responsive to an actuation of the rod by the drive.

6 Claims, 2 Drawing Sheets

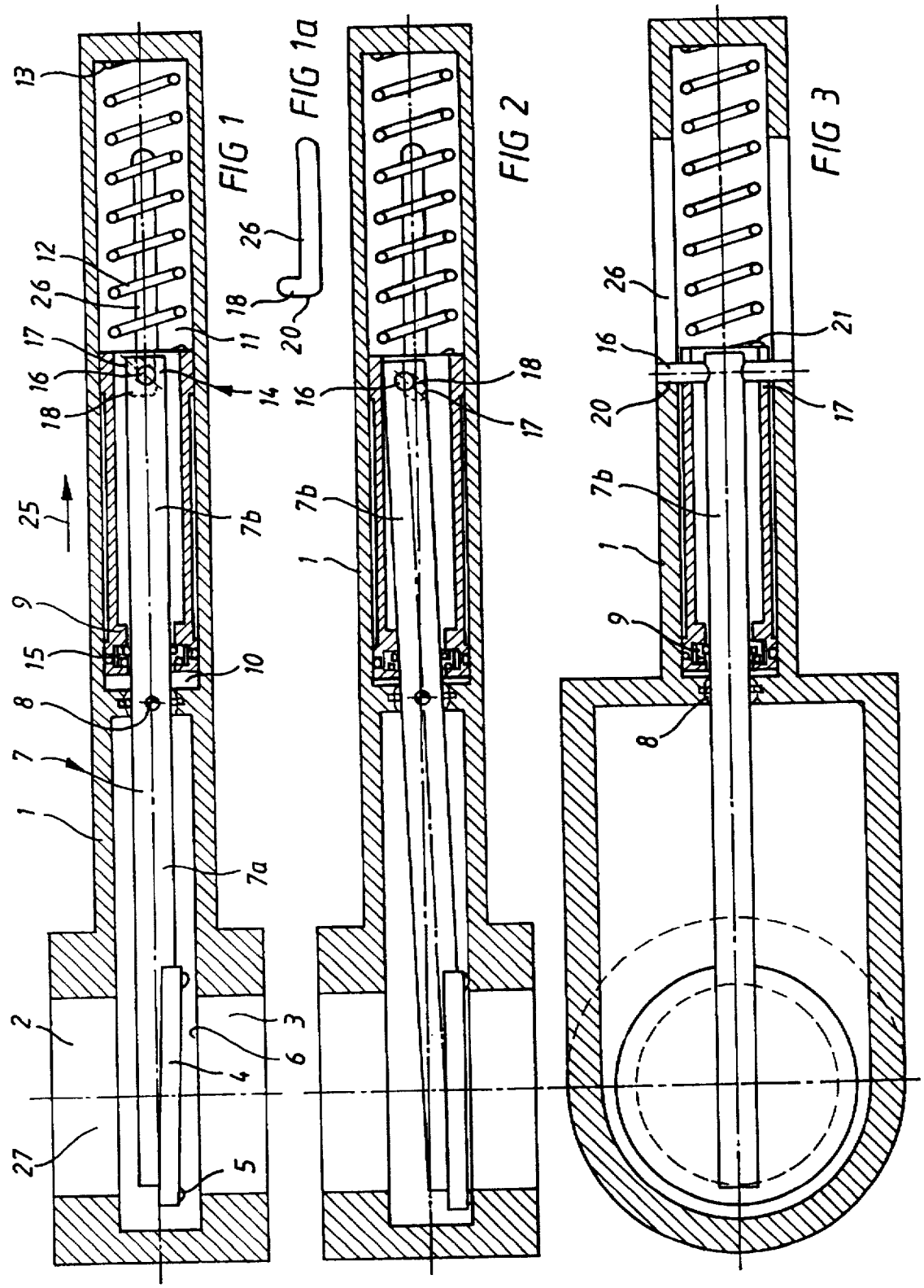

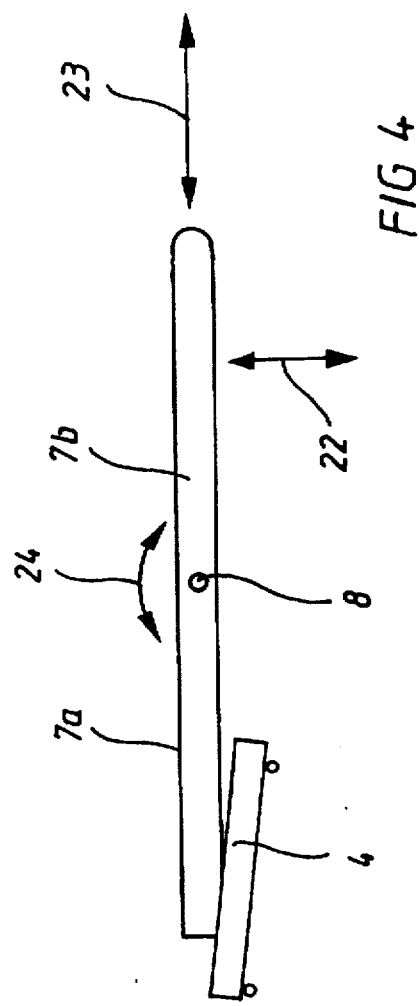

VALVE MECHANISM FOR A VACUUM VALVE

This application is a continuation of application Ser. No. 08/447,342, filed May 23, 1995, now abandoned.

CROSS-REFERENCE TO RELATED APPLICATION

This application claims the priority of patent application P 44 18 019.5 of May 24, 1994, the subject matter of which is incorporated herein by reference.

FIELD OF THE INVENTION

The invention relates to a valve mechanism for a vacuum valve, particularly for a particle-free valve.

BACKGROUND OF THE INVENTION

Vacuum valves of the above type are used in vacuum technology for controlling gas flows. In such vacuum valves, a valve disk come to rest against a seal seat under the control of a valve mechanism, or is moved away from this seal seat by the valve mechanism in order to open the flow-through cross-section of the vacuum valve.

In conventional vacuum valves known up to now, the valve mechanism needed to operate the valve disk is disposed in the chamber exposed to the vacuum. The disadvantage of the above arrangement is that parts disposed in the vacuum chamber tend to rub together, and may need to be lubricated.

In the arrangement of the above parts in the vacuum chamber, the danger exists that particles can break away from the parts, and that lubricant particles can likewise be incorporated into the vacuum flow.

A valve of the above-described type is shown, for example, in European Patent Application 0 441 646 A1 which describes a sliding valve that can be opened and closed, by a driven rod. The sealing part of the valve must execute a relative movement in two spatial axes. The drive and setting elements are located partially inside the vacuum chamber. Thus, the danger exists of particle generation by these drive and setting elements, which is undesirable for certain applications.

This type of valve is subsequently inapplicable in, for example, the semiconductor industry, because the freedom from particles necessary in the vacuum chamber cannot be guaranteed.

OBJECT AND SUMMARY OF THE INVENTION

It is therefore an object of the invention to refine a valve mechanism for a vacuum valve of the type mentioned at the outset such that a particle-free valve is created, that is, a valve in which no particles are carried into the vacuum chamber.

An essential feature of the invention is the fact that the entire valve mechanism (drive mechanism for the valve disk) is disposed outside of the chamber exposed to the vacuum.

With the given technical teaching, the significant advantage exists that, according to the invention, all of the rubbing and possibly also lubricated parts are disposed outside of the vacuum chamber, completely ruling out the possibility that some particles from this mechanism will enter the chamber exposed to the vacuum and contaminate the gas flow.

A number of possibilities for the configuration of the valve mechanism exists; these are all to be encompassed by the concept of the invention.

Basically, embodiments which operate particularly simply and reliably are preferred. A feature of the above embodiments is that the rod, which is connected to the valve disk, is displaced by way of a piston that is driven to be displaceable in a cylinder housing by means of a pressure medium; actuation of the piston results in an actuation of the rod together with the valve disk.

It is preferable when a movement control which ensures that the valve disk can be moved into its closed position and open position is disposed in the region of the piston. This type of movement control is preferably configured as a sliding control.

In another preferred embodiment of the invention, the movement control (longitudinal displacement) of the rod and the tilting movement of the rod are effected by separate drives, a piston being associated with each drive.

Thus, the invention is not limited solely to the embodiment of the sliding control; rather, the essential feature claimed is that the movement control as such is disposed outside of the chamber exposed to the vacuum.

A further, essential advantage of the invention is that no translatory movements are executed in order to open and close the valve; instead, a simple tilting movement that is easy to control is executed. In this instance, the rod, on which the valve disk is disposed, is pivotably seated in a tilting bearing, and the valve disk is disposed at the one free end of the rod configured as a two-armed lever, while the tilting mechanism is disposed at the other lever end.

In a preferred embodiment of the invention, the above tilting mechanism is configured as a sliding control. However, instead of the sliding control, a further piston can also be used to control the tilting movement.

Likewise, other tilting drives can be used, for example an electromagnet, or a hydraulically- or pneumatically-actuated piston.

The tilting drive can be driven only in one direction, while the return movement is effected by means of a corresponding restoring spring.

BRIEF DESCRIPTION OF THE DRAWINGS

The invention is described in detail below in conjunction with drawings illustrating a plurality of embodiments. Further essential features and advantages of the invention ensue from the drawings and their description.

FIG. 1 schematically shows a section through a vacuum valve according to the invention, in the open position;

FIG. 1a shows the guide slot of the valve housing;

FIG. 2 shows the valve according to FIG. 1 in the closed position;

FIG. 3 shows the valve according to FIGS. 1 and 2 in the closed position; and

FIG. 4 shows a schematic view of a further embodiment.

DETAILED DESCRIPTION OF THE PREFERRED EMBODIMENTS

Upper and lower flange connections 2, 3, through which corresponding gas flows are conveyed, are disposed in a housing 1 of a vacuum valve.

FIG. 1 does not show the completely open position of the valve, because in the completely open position the valve disk 4 is displaced in arrow direction 25, and is drawn out of the region of flange connections 2, 3.

Valve disk 4 is fixedly connected to a rod 7, which is configured as a two-armed lever. The one rod end 7a is provided for holding valve disk 4, and the other rod end 7b is provided in front of rod 7 for controlling the movement of the rod. Rod 7 is seated in a tilting bearing 8 in housing 1 so as to pivot in arrow directions 24 (FIG. 4).

Valve disk 4 has a seal 5, which cooperates with a valve seat 6 on flange connection 3.

A piston 9, which is displaceable in a cylinder chamber 10 of housing 1, both in arrow direction 25 and in the direction opposite thereto, is provided for movement control (longitudinal displacement) of rod 7 and valve disk 4. For this purpose, piston 9 is sealed against the cylinder housing with a seal 15, and a front cylinder chamber 10 is provided.

The return movement of piston 9 is effected by a spring 12 that lies with its one end against a stop 13 on housing 1, and with its other end against a stop 21 on piston 9.

The rear cylinder chamber 11 is therefore not acted upon by a pressure medium.

However, in another embodiment, not shown in detail, spring 12 can be omitted and, in its place, cylinder chamber 11 can likewise be acted upon by a pressure medium.

For the longitudinal displacement of piston 9, cylinder chamber 10 is acted upon by pressure; at the same time, a cross-pin 16, which rests against a stop 20 on housing 1 in the forward displacement position of rod 7, is disposed to be fixed against relative rotation at rod end 7b of rod 7.

If pressure chamber 10 is acted upon by pressure medium, piston 9 travels toward the back in arrow direction 25. At the same time, cross-pin 16 moves from its upper, contacting position in diagonal guide 17 into the lower, contacting position (FIG. 1); for the above to happen, the vacuum valve is configured such that valve disk 4 is not completely opened until piston 9 has moved toward the back. Hence, there is positive guidance of valve disk 4 and thus of the entire tilt control, because, during a longitudinal displacement of piston 9 in arrow direction 25, the cross-pin moves into its lower position in diagonal guide 17, and a displacement of rod 7 in arrow direction 25 takes place once valve disk 4 is lifted from valve seat 6. It is noted that diagonal guide 17 is disposed, as shown in FIG. 3, in the walls of the piston at each side thereof in registration with straight, non-horizontal guide 18.

Conversely, valve disk 4 can be closed by moving piston 9 forward in the direction opposite the arrow direction 25 shown in FIG. 2. This traveling movement takes place due to the effect of spring 12, and cylinder chamber 10 is relieved in the process.

In this forward-oriented movement, cross-pin 16 moves into the upper, contacting position in the region of diagonal guide 17 according to FIG. 2, and rod 7 thus tilts around oblique bearing 8 in arrow direction 24, and seal 5 thus rests against valve seat 6.

The straight guide 18 further shown in FIG. 1a is a straight guide for cross-pin 16.

Disposed in the side walls of the housing are slots 26, which respectively lie opposite one another and are aligned, and into each of which one end of cross-pin 16 extends.

The end of slot 26 is widened in the form of the illustrated straight guide 18, as shown in FIG. 1a.

As long as cross-pin 16 is located in the region of slot 26, rod 7 cannot be tilted around tilting bearing 8.

However, as soon as cross-pin 16 is at the end of slot 26 moves into the region of straight guide 18, under the force of spring 12 and with simultaneous relief of pressure chamber 10, cross-pin 16 rests against stop 20. The vertical length of this stop 20 is greater than the height of slot 26; therefore, the cross-pin can be tilted around pivot bearing 8 in the region of this stop 20.

The sliding element 14 represented here can also be realized with other means. The invention is therefore not limited to the function of the sliding element.

FIG. 4 shows the general form in which other movement drives for tilting rod 7 in arrow directions 24 can be configured.

It is shown schematically that an arbitrary drive can act upon rod end 7 in order to displace the entire rod 7 in arrow directions 22.

It is also shown generally that a further drive can act upon rod end 7 in order to displace the entire rod 7 in arrow directions 23.

An important feature of all of the embodiments is that the entire movement mechanism of the vacuum valve is disposed outside of the evacuated chamber, and that a metal bellows (not shown in the drawing) is additionally included as a seal between valve rod 7 and housing 1.

The additional metal bellows to be used serves as a seal so the necessary freedom from particles can be realized.

It is to be understood that the above description of the present invention is susceptible to various modifications, changes and adaptations, and the same are intended to be comprehended within the meaning and range of equivalents of the appended claims.

What is claimed is:

1. A valve mechanism for a vacuum sliding valve comprising:
   a valve housing including:
      a vacuum chamber having a throughgoing opening therein, the vacuum chamber being free from setting elements which move relative to one another;
      two side walls partially defining a drive region therebetween, the drive region being disposed adjacent to and outside of the vacuum chamber; and
      a sealing interface disposed between the vacuum chamber and the drive region for sealing the vacuum chamber and the drive region with respect to one another;
   at least one valve disk disposed in the vacuum chamber;
   at least one rod having a first end disposed in the vacuum chamber and a second end disposed in the drive region, the rod being connected to the valve disk at the first end thereof and sealingly extending through the sealing interface out of the vacuum chamber and into the drive region;
   a tilting bearing disposed at the sealing interface and being configured such that the rod tilts about the tilting bearing and moves translationally through the tilting bearing for sealingly opening and closing the throughgoing opening with the valve disk, the tilting bearing including a shaft, the rod being movably seated on the shaft; and
   at least one drive disposed in the drive region for moving the valve disk to sealingly open and close the throughgoing opening, the drive being engaged with the rod at the second end of the rod in the drive region such that an actuation of the rod is positively controlled from a region outside of the vacuum chamber by the drive, the drive including a sliding control for moving the rod about the shaft comprising:
      a first guide slot disposed on one of the two side walls;
      a second guide slot disposed on another one of the two side walls and parallel with respect to the first guide slot, wherein the first guide slot and the second guide slot each include a horizontal guide portion and a non-horizontal guide portion extending at one end of the horizontal guide portion; and a cross pin connected to the rod and extending through the first guide slot and the second guide slot, the cross pin being adapted to be guided through the horizontal guide portion and the non-horizontal guide portion of each of the guide slots for effecting a translational and a tilting movement of the rod, respectively, upon an actuation of the rod by the drive.

2. The valve mechanism according to claim 1, wherein the drive includes a piston operatively connected to the rod for actuating the rod in a longitudinal direction.

3. The valve mechanism according to claim 2, wherein:

the drive region is a cylinder chamber; and the piston is adapted to be disposed in the cylinder chamber of the housing.

4. The valve mechanism according to claim 1, wherein the drive includes a first drive for actuating the rod in the longitudinal direction, and a second drive cooperating with the first drive for moving the rod about the shaft.

5. The valve mechanism according to claim 1, wherein the piston has an initial position and an actuated position, the valve mechanism further including a restoring spring for returning the piston to its initial position from its actuated position.

6. The valve mechanism according to claim 1, further including a metal bellows disposed between the rod and the housing.

* * * * *